Oct. 20, 1936. H. K. WHEELER 2,058,115
TURNTABLE
Filed Aug. 21, 1931 2 Sheets-Sheet 1

Inventor.
Holman K. Wheeler.

Oct. 20, 1936.  H. K. WHEELER  2,058,115
TURNTABLE
Filed Aug. 21, 1931  2 Sheets-Sheet 2

Inventor.
Holman K. Wheeler.

Patented Oct. 20, 1936

2,058,115

UNITED STATES PATENT OFFICE 2,058,115

TURNTABLE

Holman K. Wheeler, Newton Center, Mass., assignor to Mechanical Transfer Car Corporation, St. Johnsbury, Vt., a corporation of Vermont Application August 21, 1931, Serial No. 558,484

4 Claims. (Cl. 104—44)

The present invention relates to a turnstile, but more particularly to a rotating turntable applicable to rotating automobiles in garages.

In such a mechanism, it is necessary to be able to turn a car around without permanently occupying a great deal of space for the machinery, and further without constructing the device in a well in the floor. This may be due to the fact that the floor cannot be broken away as in the case of basements where the flooring is made waterproof, or it may be due to a lack of floor height or on account of floor construction.

In the present invention, a turntable is provided which is only fixed in the floor at one place which may be constructed to prevent water from coming through if the floor happens to be a basement if desired, and which need not cause a change of the floor construction. The turntable is also constructed in such a way that it may be easily operated by the driver of the car whether he is approaching from one direction or from the other.

Figure 1:
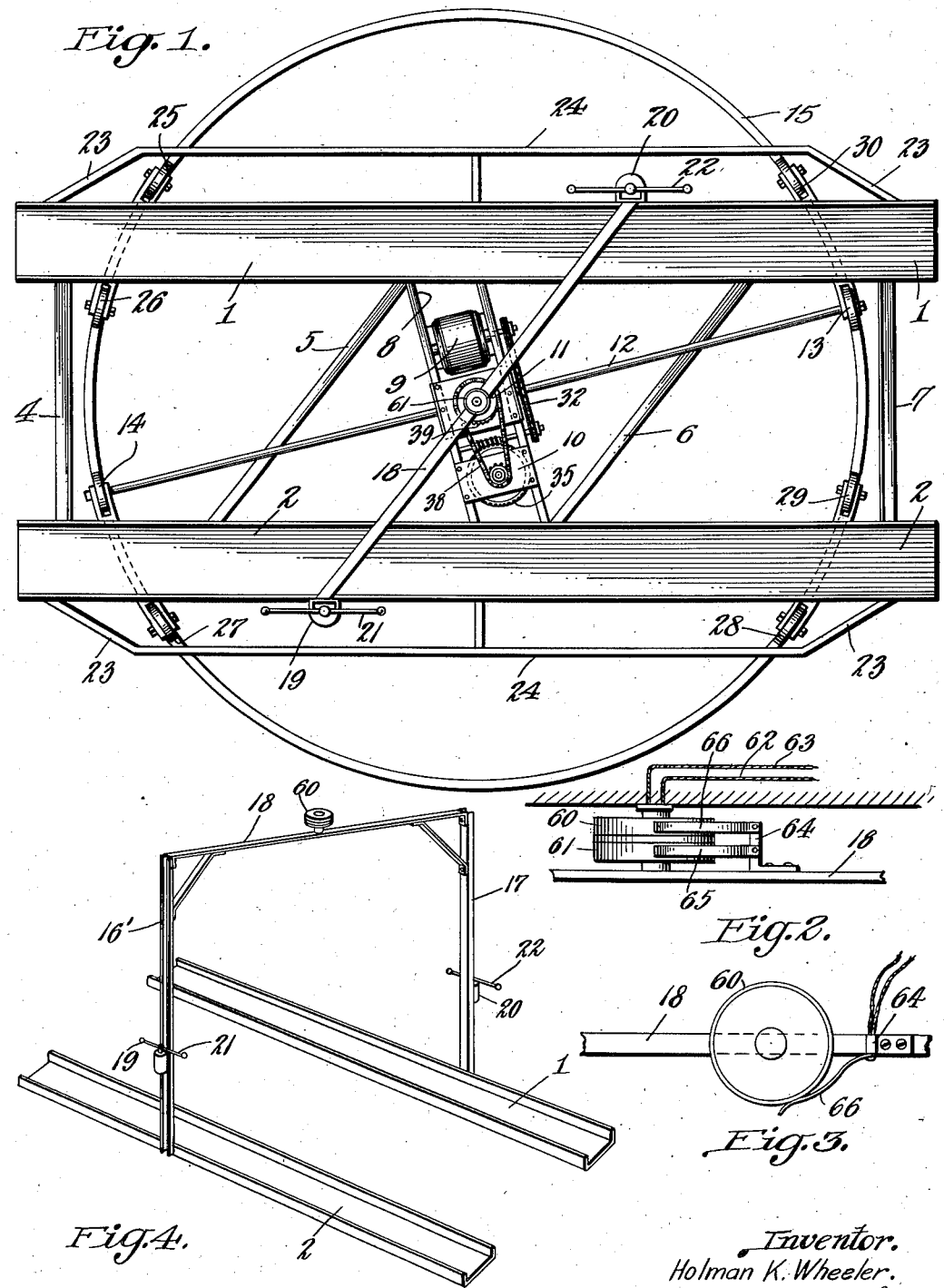
Figure 2:
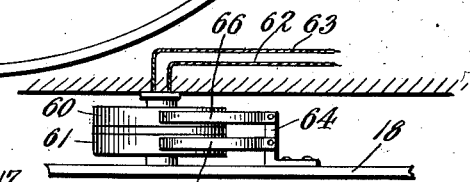
Figure 3:
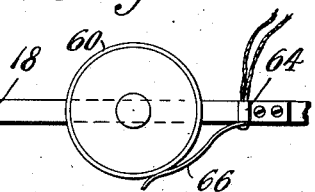
Figure 4:
Figures 5, 6:
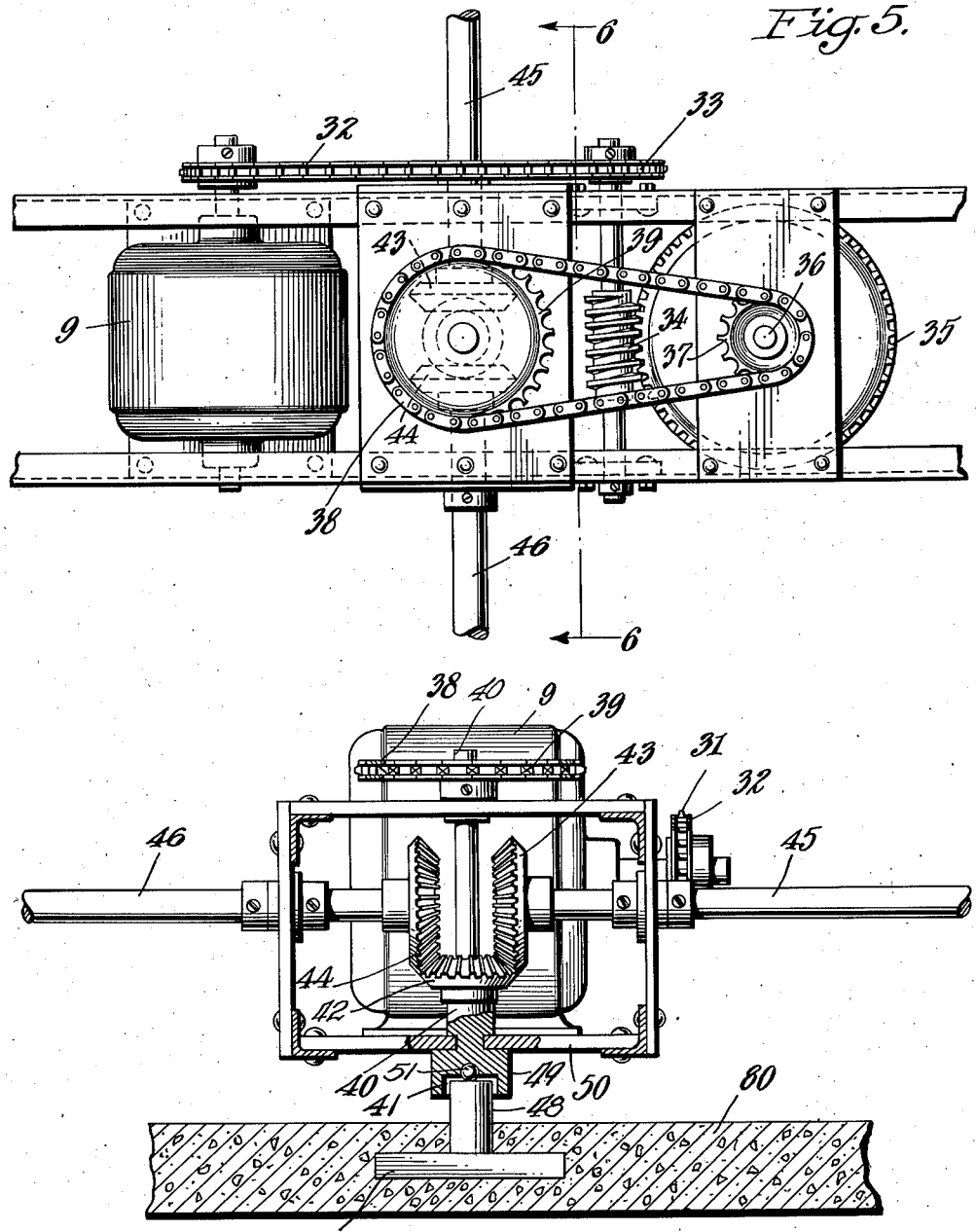

Without discussing further the general features of the invention, it will be described in connection with the drawings showing an embodiment of the same in which, Figure 1 shows a plan view of the turn table; Figure 2 shows a detail of the means of conducting power to the turntable; Figure 3 shows another view of the details shown in Figure 2; Figure 4 shows in a perspective manner the electrical connections and the position of the switches; Figure 5 shows the detail of the driving mechanism and Figure 6 shows a further view of the details shown in Figure 5.

In Figure 1, the turn table is constructed of a pair of channels 1 and 2 joined together by supporting beams 4, 5, 6, and 7. Extending across from the channels 1 and 2 is a supporting frame 8 on which is mounted the driving mechanism comprising the motor 9, the reduction gear 10, and the differential 11, to drive the two-part driving shaft 12. The driving shaft 12 at the right drives in one direction, and at the left, drives in the opposite direction, so that both wheels 13 and 14 move to drive the car in the same rotational direction around the track 15.

As indicated in Figure 4, extending from the channels 1 and 2 at the sides is a frame comprised of side bar 16' and 17 and a top cross bar 18. On the side bars 16' and 17 are mounted the switches 19 and 20 which have extending handles 21 and 22, by which the direction of operation of the motor 9 may be controlled.

The framework of the channels 1 and 2 with the inwardly supporting elements may be finished with the external guards 23 and 24. The whole turntable rests on a group of wheels, 25, 26, 27, 28, 29, and 30, which move on the circular rail 15 laid on the floor. Each wheel is mounted on a truck or bearing which is welded or riveted to the channels 1 and 2.

The driving mechanism is shown more in detail in Figures 5 and 6. Here the motor 9 drives a gear 31 on the motor shaft. This gear drives a chain 32 which is connected to a similar gear 33 of the reduction system 10. The gear 33 drives the worm gear 34 which in turn drives the spur gear 35. The spur gear 35 drives the shaft 36 and gear 37 which drives through the chain 38 the spur gear 39 of the differential system 11. The gear 39 is mounted on the shaft 40 extending down into the thrust bearing 41 and carries the bevelled gear 42 which meshes with the gears 43 and 44 driving the shafts 45 and 46 in opposite directions. This is the shaft 12 of Figure 1.

In Figure 6 the driving mechanism is pivoted for rotation in the floor 80 by means of the anchor 47, having an upwardly extending shaft 48. The shaft 48 is stationary, but the supporting frame 50, because of the rotation of the turntable moves about it, and there is therefore provided a ball bearing collar 49 between the frame and the shaft.

The shaft 40 which rotates faster than the frame 50 is mounted on a ball bearing 51 in the upper part of the frame.

In Figures 2 and 3 is shown the method of conducting the current to the motor and switches. Mounted from the ceiling above the center of the turntable are two commutators 60 and 61, to which the power is conducted by the lines 62 and 63, respectively. Mounted on the frame 18 is an arm 64 having brushes 65 and 66 which connect to the motor 9 and the switches 19 and 20. The brushes 65 and 66 rotate with the turntable and keep contact with the commutators 60 and 61 at all times.

Having now described my invention, I claim:

1. A turntable having two parallel channels adapted to receive a motor vehicle approaching in the direction of the channels from either end thereof, a plurality of wheels mounted at the ends of the channels and on both sides of each channel, said wheels being spaced equidistant from the turntable center, and means positioned at the center of the turntable for driving simultaneously certain of said wheels positioned on opposite ends of the channels.

2. A turntable having two parallel channels adapted to receive a motor vehicle approaching in the direction of the channels from either end thereof, a plurality of wheels mounted at the ends of the channels and on both sides of each channel, said wheels being spaced equidistant from the turntable center, one pair of said wheels being the drivers and located at the opposite ends of the same diameter, and means positioned at the center of the turntable for driving said drivers.

3. A turntable having two parallel channels adapted to receive a motor vehicle approaching in the direction of the channels from either end thereof, a plurality of wheels mounted at the ends of the channels and on both sides of each channel, said wheels being spaced equidistant from the turntable center, and means positioned at the center of the turn-table for driving simultaneously wheels positioned on opposite ends of the channels, including a motor, a reduction gear operated thereby, a differential operated by said gear and a pair of drive shafts connected to said differential and driving said wheels.

4. A turntable having two parallel channels adapted to receive a motor vehicle approaching in the direction of the channels from either end thereof, a plurality of cross rods joining said channels in a permanent frame, a plurality of wheels mounted at the ends of the channels and on both sides of each channel, said wheels being spaced equidistant from the turntable center, a support formed at the center of the turntable between said channels, means including a driving shaft supported thereon and extending centrally across said table between the channels, said driving shaft being coupled directly to two of said wheels.

HOLMAN K. WHEELER.